United States Patent
Hayama et al.

(10) Patent No.: US 6,168,323 B1
(45) Date of Patent: *Jan. 2, 2001

(54) TAPE PRINTING APPARATUS

(75) Inventors: Hitoshi Hayama, Nagano-ken; Kenji Watanabe, Tokyo, both of (JP)

(73) Assignees: Seiko Epson Corporation; King Jim Co., Ltd., both of Tokyo (JP)

( * ) Notice: Under 35 U.S.C. 154(b), the term of this patent shall be extended for 0 days.

This patent is subject to a terminal disclaimer.

(21) Appl. No.: 09/095,378

(22) Filed: Jun. 10, 1998

Related U.S. Application Data

(63) Continuation of application No. 08/507,515, filed on Nov. 20, 1995, now Pat. No. 5,810,486.

(30) Foreign Application Priority Data

Dec. 22, 1993 (JP) .................................................. 5-325162

(51) Int. Cl.[7] ...................................................... B41J 5/00
(52) U.S. Cl. ................................ 400/61; 400/63; 400/83; 400/615.2
(58) Field of Search ................................. 400/61, 62, 63, 400/76, 83, 477, 615.2, 586

(56) References Cited

U.S. PATENT DOCUMENTS

| | | | |
|---|---|---|---|
| 5,382,100 | 1/1995 | Sakuragi et al. | 400/9 |
| 5,562,353 | 10/1996 | Handa et al. | 400/615.1 |

FOREIGN PATENT DOCUMENTS

| | | |
|---|---|---|
| 0551995 | 7/1993 | (EP) . |
| 0577247 | 1/1994 | (EP) . |
| 2232799 | 12/1990 | (GB) . |
| 358166 | 3/1991 | (JP) . |
| 372461 | 7/1991 | (JP) . |
| 5185654 | 7/1993 | (JP) . |
| 5185663 | 7/1993 | (JP) . |
| 5338267 | 12/1993 | (JP) . |
| 6015909 | 1/1994 | (JP) . |

OTHER PUBLICATIONS

International search report for application serial No. PCT/JP94/02173.

*Primary Examiner*—Stephen R. Funk
(74) *Attorney, Agent, or Firm*—Hogan & Hartson, LLP

(57) ABSTRACT

There is provided a tape printing apparatus for printing desired character string data on a tapelike printing object, in which a plurality of functions can be set with a single physical operator. When a character size setting function key is operated (S14), the position of a cursor existing on a display screen is detected. The character size is set over the whole sentence (S24) if the cursor is positioned on the right side of a line head mark, set by paragraph (S23) if the cursor is positioned at the head of the first line of each paragraph, and set by line (S22) if the cursor is positioned on the right side of the head of a line of each paragraph. In other cases, the size of characters from the cursor on is set or the character size is set word by word (S20, 21).

13 Claims, 13 Drawing Sheets

FIG. 4(a)
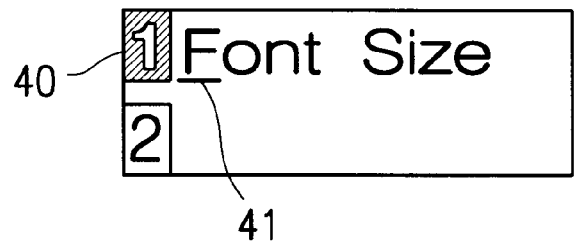
FIG. 4(b)
FIG. 4(c)
Font Size

FIG. 6(a)
FIG. 6(b)
*Font Decoration*
FIG. 6(c)
FIG. 6(d)
FIG. 6(e)
*Font Decoration*

FIG. 7(a)
FIG. 7(b)
Font Type
FIG. 7(c)
FIG. 7(d)
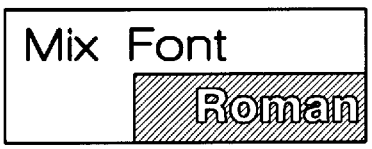
FIG. 7(e)
Font Type

FIG. 9(a)

| 1 | Font Size |
| 2 | Two Lines |

FIG. 9(b)

Mix Size
3    3W    4

FIG. 9(c)

Mix Size
3    3W    4

FIG. 9(d)

Font  Size
Two Lines

FIG. 12(a)

Change of Printing Fonts

FIG. 12(b)

1 Change_of Printing Fonts
2

FIG. 12(c)

Word Size
1    2    3

FIG. 12(d)

Change of Printing Fonts

TAPE PRINTING APPARATUS

This is a continuation of application Ser. No. 08/507,515 filed Nov. 20, 1995, now U.S. Pat. No. 5,810,486.

TECHNICAL FIELD

The present invention relates to a tape printing apparatus for printing print data, such as a desired character string, on a tape, and more particularly, to a tape printing apparatus having a function for arbitrarily setting a character attribute such as character size and a font.

BACKGROUND ART

There has been before provided a tape printing apparatus for printing data such as a desired character string (characters, signs and the like) on a tapelike print object. In this apparatus, a cassette case housing the tapelike print object is detachably mounted. Printing on the print object is performed by loading the cassette case in the tape printing apparatus. In the tape printing apparatus having such a structure, the size of characters to be printed is automatically changed according to the width of the tape in the set tape cassette as shown in Japanese Patent Laid-Open No. 3-72461.

As mentioned above, the latest tape printing apparatus automatically switches the size of characters by line according to the width of the printing tape housed in the set tape cassette, and therefore, it is impossible to imagine what a print on the printing tape will be like.

The present invention aims to solve such a problem, and an object of the present invention is to provide a tape printing apparatus which can set, with a few operation keys, a character attribute, such as a character size and a font, by paragraph or line and set the character size character by character in a line.

DISCLOSURE OF THE INVENTION

In order to achieve this object, a tape printing apparatus of the present invention comprises a character attribute setting means for changing an object, whose character attribute can be set, according to positional information from an input data position specifying means.

In the tape printing apparatus of the present invention which has the above structure, since settings in different areas, for example, change of character size over the whole line or character by character in the line, can be made with a single operation key based on a cursor position displayed on a display, operability of the tape printing apparatus can be enhanced drastically.

BRIEF DESCRIPTION OF THE DRAWINGS

FIGS. 4 (a)–4(c) is a view showing a display state of an LCD panel representing the embodiment of the present invention when the character size is set line by line, and a print result in the setting.

FIGS. 6(a)–6(e) is a view showing a display state of the LCD panel when character ornament is to be changed by a character attribute setting means, and a print result in the setting.

FIGS. 7(a)–7(e) is a view showing a display state of the LCD panel when the type of a character font is to be changed by the character attribute setting means, and a print result in the setting.

FIGS. 9(a)–9(d) is a view explaining the setting of character size of characters from a cursor on.

FIGS. 12(a)–12(d) is a view explaining the setting of character size word by word.

Figure 1:
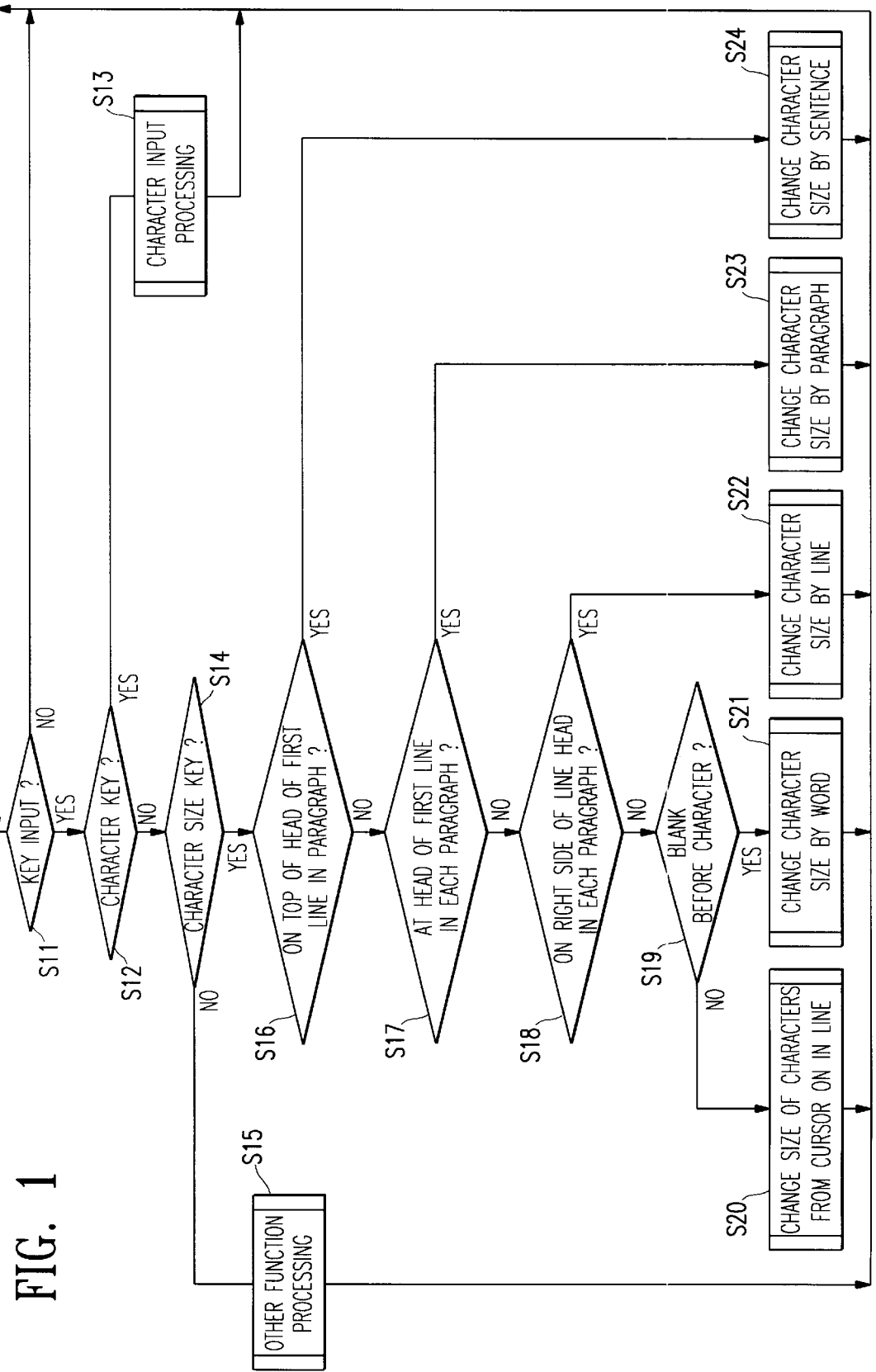
FIG. 1 is a view of a flow chart showing a key input processing routine of a tape printer or writer representing an embodiment of the present invention.

Numerals respectively denote the following components.

1 . . . a tape writer
10 . . . a main case
11 . . . a keyboard
11a . . . a power key
11b . . . a print key
11c . . . a size key
12 . . . an LCD panel
13 . . . a main cover
14 . . . a tape cartridge holder
15 . . . a thermal head
16 . . . a tape ejection slot
17 . . . a cutter button
20 . . . a tape cartridge
22 . . . a printing tape
30 . . . a controller
31 . . . a CPU
32 . . . an input
33 . . . a printer
34 . . . a display
40 . . . a line head mark
41, 51, 101, 111 . . . cursors
42 . . . an inverted character size display portion

BEST MODE FOR CARRYING OUT THE INVENTION

In order to make the above-mentioned structure and operation of the present invention more clear, a tape writer, in which a character attribute set by the present invention is a character size, will be described hereinafter.

[Structure of Hardware]

Figure 2:
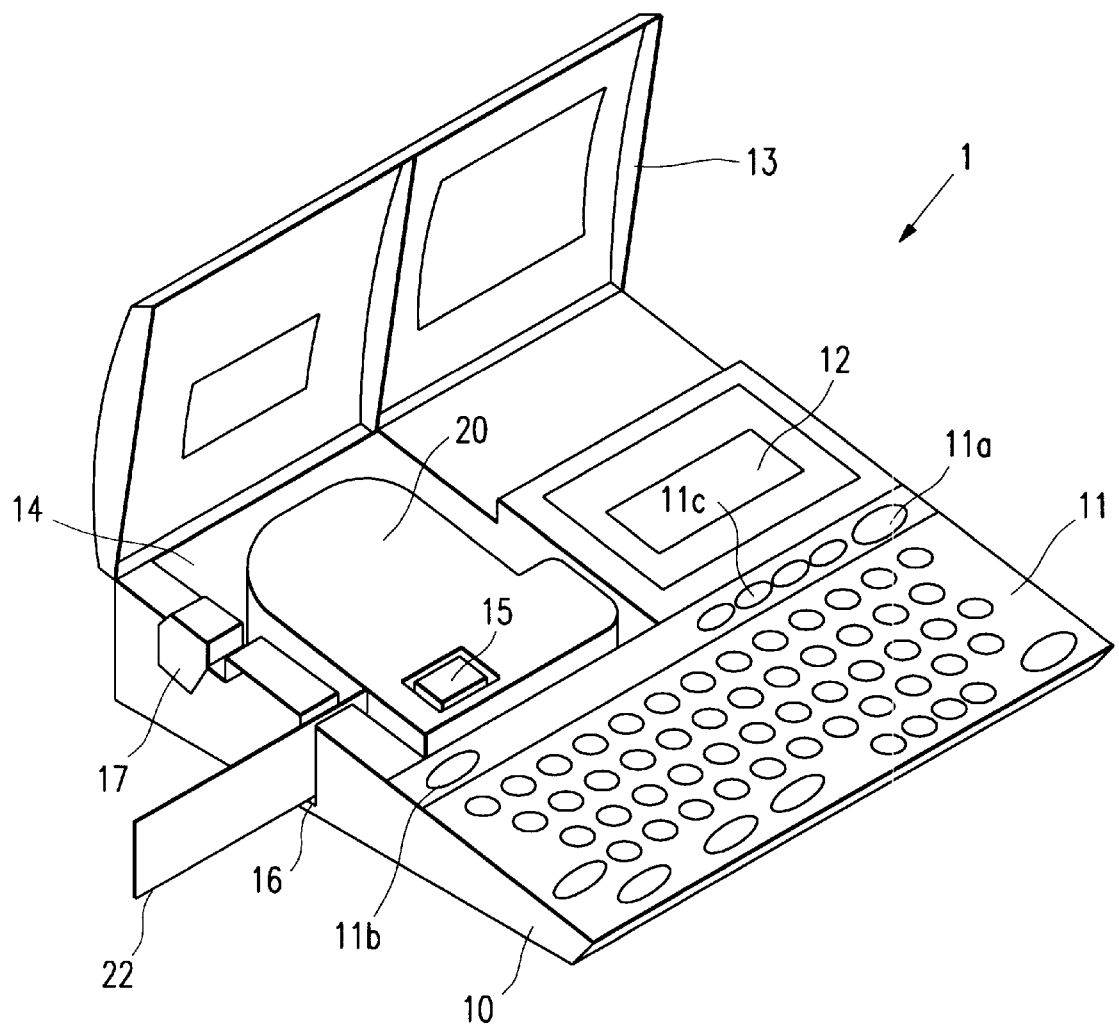
FIG. 2 is an outward view of the tape writer representing the embodiment of the present invention.

FIG. 2 is a view showing the outward appearance of a tape writer 1 according to this embodiment. The tape writer 1 comprises, as shown in the figure, a main case 10 for housing various components therein, a keyboard 11 with 63 input keys, a liquid crystal panel for displaying a character string or other information (referred to as "LCD panel" hereinafter), and a main cover 13 which can open and close. A tape cartridge 20, in which an unillustrated ink ribbon and a printing tape 22 to be printed by using this ink ribbon are housed, is loaded in a tape cartridge holder 14 provided on the upper left of the main body.

Figure 3:
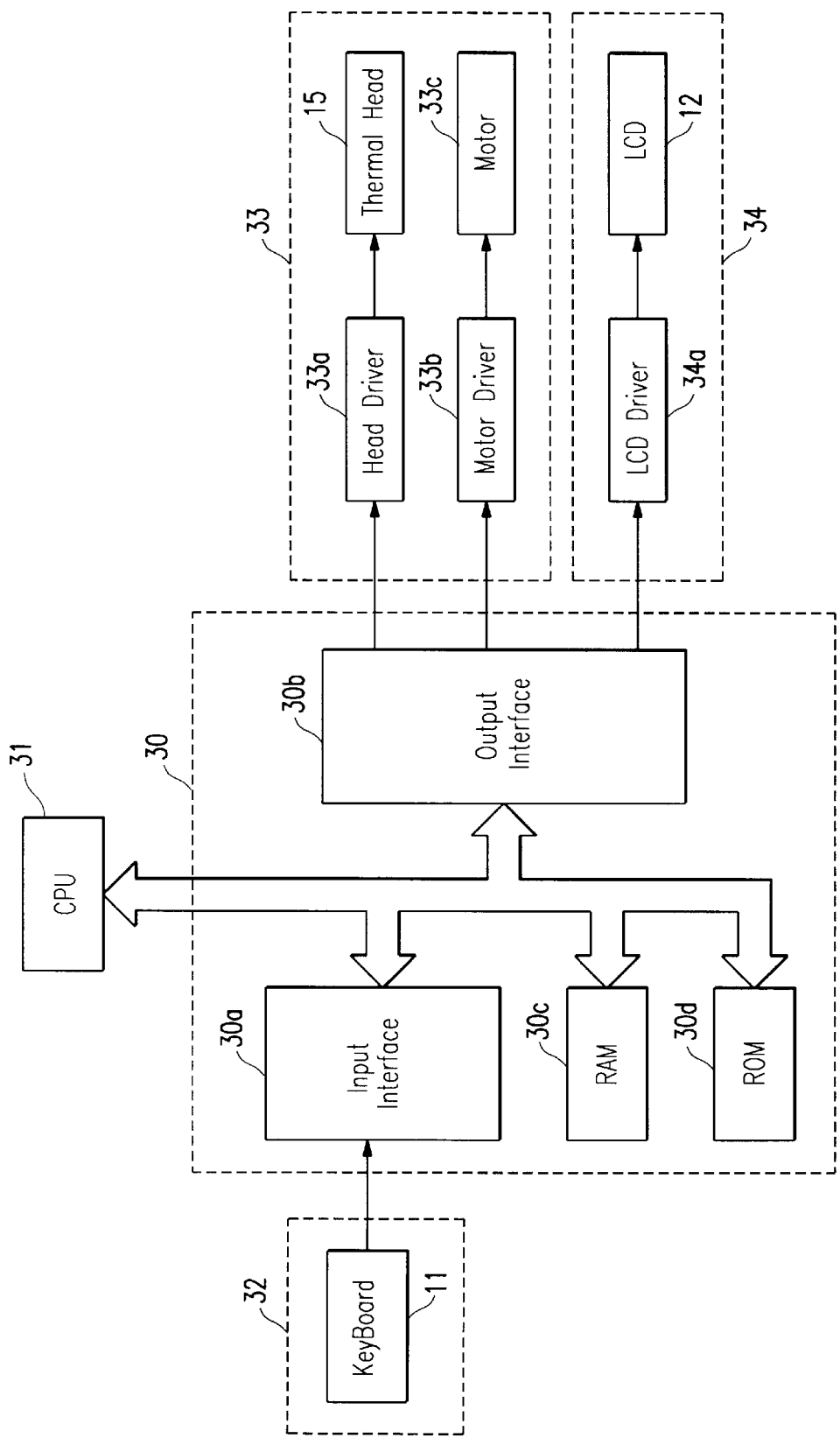
FIG. 3 is a configuration view of a control circuit of the tape writer representing the embodiment of the present invention.

When the tape writer 1 is used, the main cover 13 is first opened as shown in FIG. 2, and the tape cartridge 20 is loaded in the tape cartridge holder 14. At this time, the tape cartridge 20 is loaded so that the printing tape 22 comes out of the main case 10 through the tape ejection slot 16, and the main cover 13 is closed. Then, the power is turned on by operating a power key 11a, and characters to be printed and attributes related to the characters are input from the keyboard 11. When instructions to start printing are given by operating a print key 11b, the input characters are printed on the printing tape 22 supplied from the tape cartridge 20 according to the input attributes. The printed printing tape 22 is ejected from the tape ejection slot 16 formed on the left of the main case 10. When ejection is completed, the printing tape 22 is cut by an unillustrated cutter located near the tape ejection slot 16 of the main body by pressing down a cutter button 17, thereby making a tape capable of sticking. Next, the configuration of a controller for controlling the operation of the tape writer 1 will be described with reference to FIG. 3. In the figure, numeral 31 denotes a one-chip microcomputer (referred to as "CPU" hereinafter), to which, broadly, a controller 30, an input 32, a printer 33 and a display 34 are connected.

In the controller 30, a ROM 30d for storing a program for controlling the operation of the CPU 31 and character font data on character fonts different in character composing dot number needed to print on the printing tape 22, and a RAM 30c for storing data input from the input 32 as text or the like are connected. Furthermore, an input interface 30a and an output interface 30b for exchanging data with the input 32, the printer 33 and the display 34 are also connected.

The input 32 is composed of 63 keys, which are divided into keys for inputting characters and keys for setting various functions. The character keys are used to input characters to be printed in text. The function keys are used to designate functions, such as setting of character attributes, printing and edition of sentences in the text. Instructions to set the print character size line by line or character by character according to the present invention are given by operating the function keys. The display 34 comprises the LCD panel 12 and an LCD drive circuit 34a for driving the LCD panel, and displays data in the text stored in the RAM 30c of the controller 30.

The printer 33 comprises a thermal head 15, a stepping motor 33c, and driving circuits 33a and 33b therefore, and prints the data in the text stored in the RAM 30c of the controller 30 on the printing tape 22 according to the set attributes.

[Description of Software]

The embodiment having the above electric configuration aims to solve the above-mentioned conventional problem by software. Processing steps for solving the problem are included in a processing routine at key input. This processing will now be described.

FIG. 1 is a flow chart showing the processing at key input.

When this processing routine is started, decision is first made as to whether key input is done (S11). If input is done by any of keys, decision is made as to whether the input key is a character key (S12). If it is, an input character is stored in the RAM 30c, processing for producing display on the LCD panel 12 is performed (S13), and the processing routine is put again into a key input standby state (S11).

If the key operated for input is not a character key, but a key, to which a functional process is assigned, other than a character size key (S14), the functional process assigned to the key is carried out (S15), and the processing routine is put again into the key input standby state (S11).

Next, when a key (size key) 11c, to which a character size change function is assigned, is operated (S14), as shown in FIG. 4(a), decision is made as to where a cursor 41 is positioned on the LCD panel 12 for displaying the text (S16, 17, 18 and 19). FIGS. 4 and 5 show cases in which a one-line sentence is included in a paragraph where the cursor exists. When the cursor 41 is positioned on the right side of a line head mark 40 as shown in FIG. 4(a) (S18), a screen display shown in FIG. 4(b) for allowing the character size to be changed by line is produced. The contents to be displayed in an inverted character size display portion 42 shown in FIG. 4(b) are changed by operating a key prepared to change the character size (for example, an arrow key) in this state, the character size by line is determined by a key prepared to determine the changed state (for example, an execution key) (in this embodiment, the character size is set at 5) (S18), and the processing routine is put again into the key input standby state (S11). The result of printing performed on the set condition is shown in FIG. 4(c).

Figure 5A:
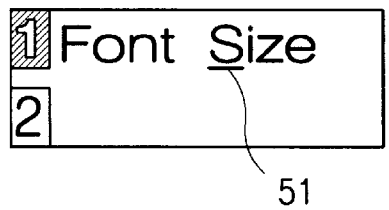
FIGS. 5(a)–5(d) is a view showing a display state of the LCD panel representing the embodiment of the present invention when the character size is set character by character, and a print result in the setting.
Figure 5B:
Figure 5C:
Figure 5D:
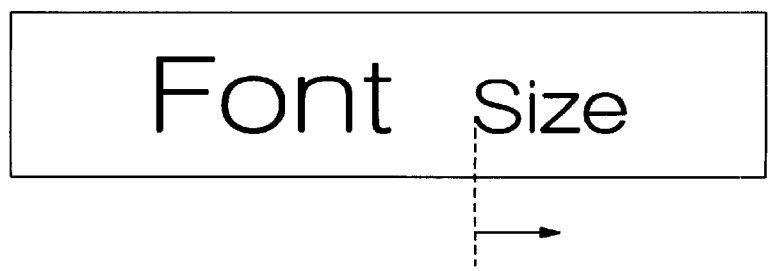
Figure 8A:
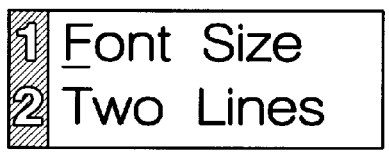
FIGS. 8(a)–8(g) is a view explaining the setting of character size line by line when the number of lines is two.
Figure 8B:
Figure 8C:
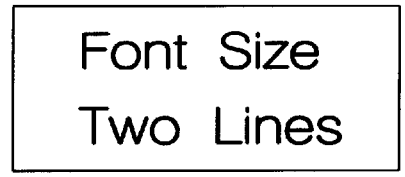
Figure 8D:
Figure 8E:
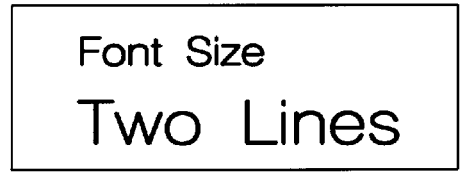
Figure 8F:
Figure 8G:
Figure 10A:
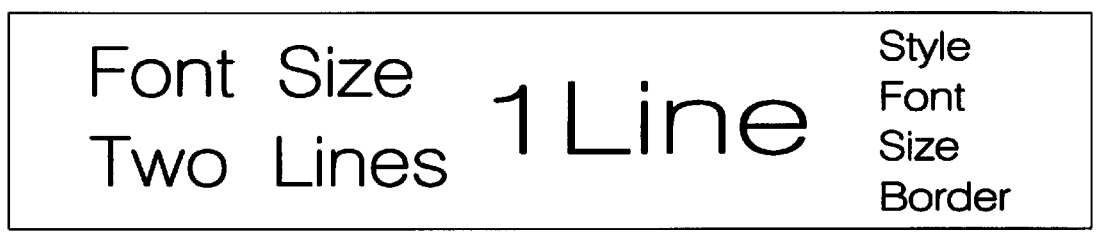
FIGS. 10(a)–10(d) is a view explaining the character size setting over the whole sentence.
Figure 10B:
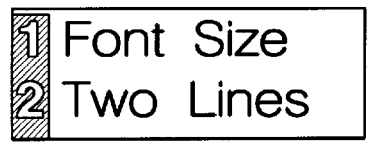
Figure 10C:
Figure 10D:
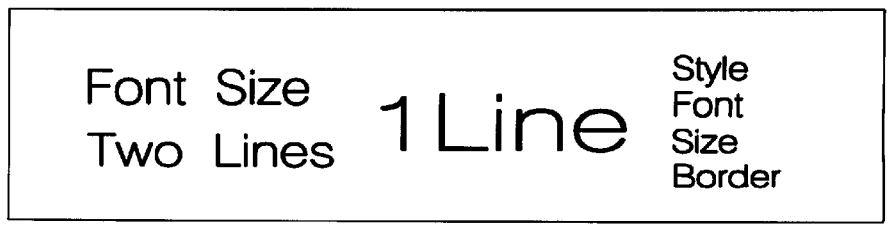
Figure 11A:
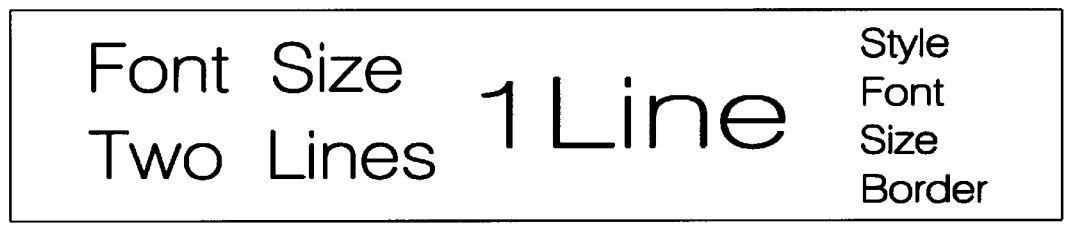
FIGS. 11(a)–11(d) is a view explaining the character size setting in a paragraph.
Figure 11B:
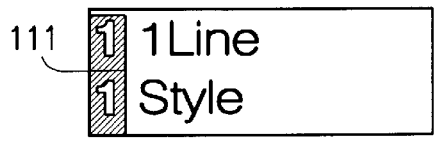
Figure 11C:
Figure 11D:
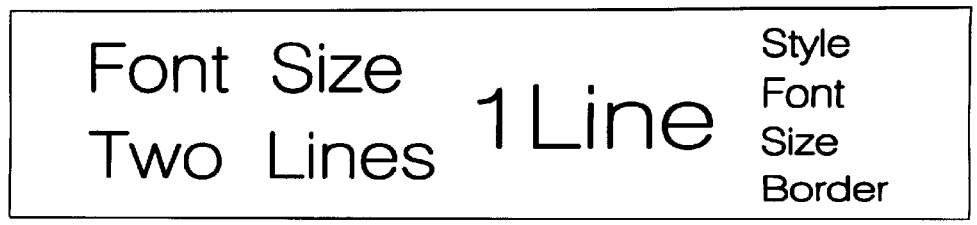

If the cursor 41 is not positioned on the right side of the line head as shown in FIG. 5(a) when the size key 11c is depressed, a screen display shown in FIG. 5(b) for allowing the size of characters from the cursor position on to be changed is produced. Herein, numerals 4, 4W and 5 denote character sizes, and bigger numerals represent bigger characters. "W" means "wide" and denotes a character measuring a large amount in a lateral direction. When the arrow key is operated in this state, the screen display is changed to a display shown in FIG. 5(c), the size smaller by one than the character size set by line with the execution key is decided on (S19), and the processing routine is put again in the key input standby state (S11). The result of printing performed on the set condition is shown in FIG. 5(d).

FIG. 6 shows an example case of character ornament. If character ornament is selected when the cursor is not positioned on the right side of the line head similarly to FIG. 5, ornament can be selected as shown in FIG. 6(a). When "Outline" shown in FIG. 6(d) is selected, characters from the cursor on are ornamented as shown in FIG. 6(e).

Figure 13A:
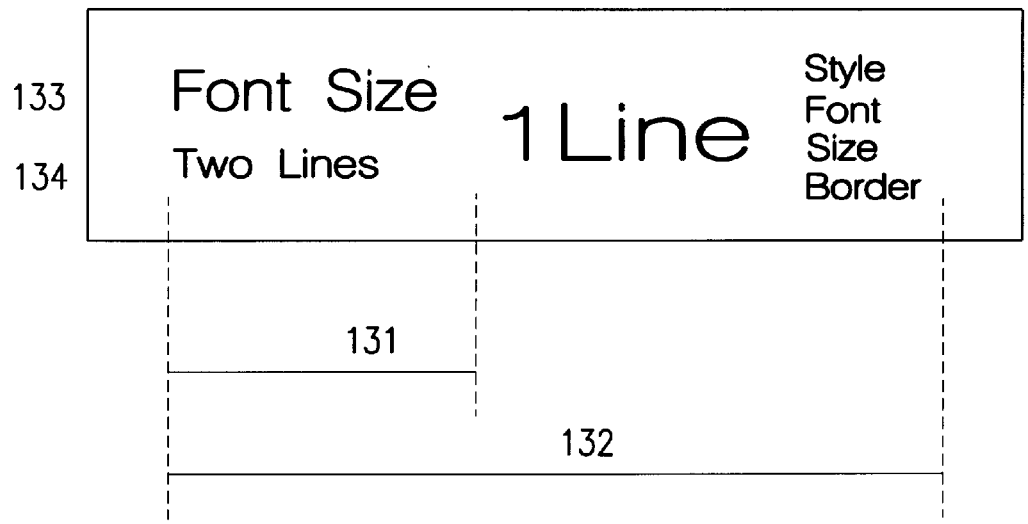
FIGS. 13(a)–13(b) is a view explaining an area in which the size is set.

Areas to be converted will now be described. FIGS. 13(a) and (b) show area names and area examples.

Figure 13B:
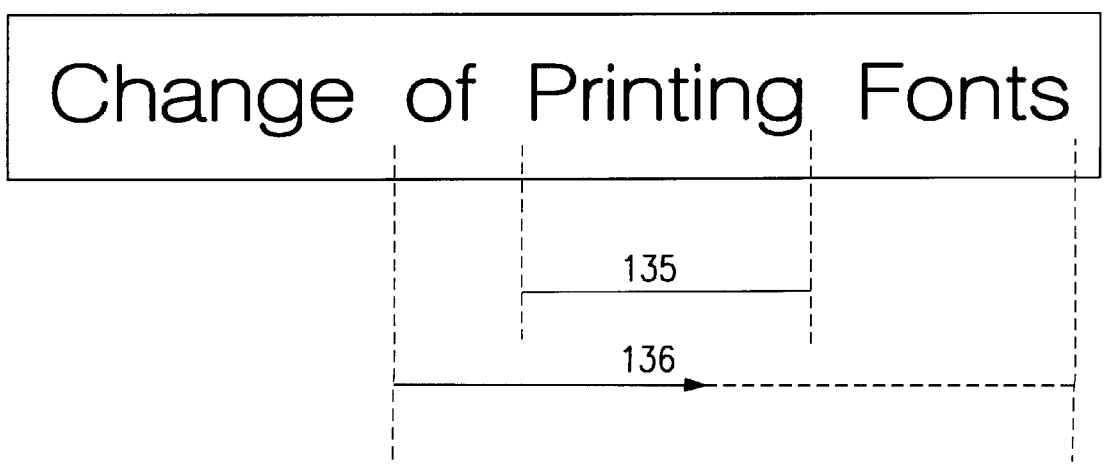

A sentence (132) is composed of at least one paragraph (131). The paragraph is composed of lines (133, 134) shown in FIG. 13(a). Each line is composed of a plurality of words (135) as shown in FIG. 13(b).

FIG. 8 shows an example case in which the number of lines is two. FIGS. 8(a) to 8(g) show states of character size settings. When the cursor is positioned at the head of a paragraph, the character is set by line in the paragraph. When the character size is selected, the display changes in order as shown in FIGS. 8(b), (d) and (f), and a case in which characters in both lines are of the same size, a case in which characters in the lower line are bigger than those in the upper line, or a case in which characters in the lower line are smaller than those in the upper line can be selected. Squares on the lower right of each of FIGS. 8(b), (d) and (f) represent images of character sizes. FIGS. 8(c), (e) and (g) respectively show print results in those cases. Although the case in which the number of lines is two is described above, the character size can be similarly selected if the number of lines is three or more.

FIG. 9 shows a case in which the size of characters from the cursor on is set. The cursor is moved under "S" of the word "Size", by which characters from "S" on is to be converted. In this case, characters in the same line of the same paragraph are only set to be converted.

FIG. 10 shows a case in which the size of characters in a sentence (all paragraphs) is set. As shown in FIG. 10(b), the cursor is put in the position of a line head mark of the first paragraph (leftmost paragraph) and further moved on the top of the line head mark by pressing an upward-pointing arrow key (↑), and the character size is set in th is state, by which the character size can be changed all over the sentence. FIG. 10(c) shows a size setting screen for selecting small characters. As a result, characters shown in FIG. 10(a) are printed in a little reduced size a s shown in FIG. 10(d).

FIG. 11 shows an example case in which the character size is set by paragraph. The character size can be set by paragraph by setting the character size in a state in which the cursor is put in the position of the line head mark as shown in FIG. 11(b). FIGS. 11(c) and (d) respectively show a size selection screen and a print result similarly to FIGS. 10(c) and (d).

FIG. 12 shows an example case in which the character size is changed word by word. According to the flow chart shown in FIG. 1, if the cursor is positioned at a blank, only the word just after the cursor is regarded as a character size setting area. When the cursor is moved to the first character of the word and setting is made, the size of characters from the cursor on is set as mentioned above.

As described above, according to the tape printing apparatus of the present invention, when the character size is changed, a plurality of setting functions, such as settings of the character size by sentence, by paragraph, by line, and by character in the line, can be achieved with a single key, depending on the cursor position displayed on the LCD panel.

Although the cursor in the display screen takes the form of an underline in this embodiment, it may be an inverted mark or a flashing mark of the same size as that of characters to be displayed on the screen.

Furthermore, although the character size to be set in FIGS. 5(b) and (c) can be smaller than the character size set in FIG. 4(b) in this embodiment, it may be changed to the bigger size.

Industrial Applicability

As the above detailed description reveals, according to the present invention, an area in which attributes of characters are set can be selected with a few types of keys or in a few key operations.

The present invention relates to a tape printing apparatus for printing print data, such as a desired character string, on a tape, and more particularly, to a tape printing apparatus having a function for arbitrarily setting character attributes such as a character size and a font.

What is claimed is:

1. A method of printing information on a tape, the method comprising the steps of:
   inputting print data;
   displaying said print data;
   indicating a position of said input data;
   setting a character attribute of said print data; and
   changing an object area in which the attribute is to be set according to the position of said input data at the time when the character attribute is set.

2. A method of printing information on a tape by a print head, the method comprising:
   inputting a sentence to be printed onto the tape by a keyboard;
   displaying the inputted sentence on a display;
   moving a cursor on the display to various positions within the sentence;
   setting a character attribute by a function key; and
   assigning the character attribute set by the function key to selected characters within the sentence as a function of the position of the cursor on the display.

3. A method of printing information on a tape-like printing medium, the method comprising the steps of:
   inputting print data;
   displaying said print data;
   indicating the position of said input data;
   setting a character attribute of said print data; and
   determining an object area in which the attribute is to be set according to the position of said input data at the time when the character attribute is set.

4. A tape printing apparatus comprising:
   input means for inputting print data representative of at least one character and control data relative to an attribute of the print data;
   display means for displaying the print data input by the input means;
   position specifying means for indicating a position of the print data displayed by the display means and outputting position data representative of the position of the print data;
   attribute setting means, responsive to the control data provided by the input means and the position data provided by the position specifying means, for determining an object area in which an attribute of the print data is to be set in at least a portion of the print data and assigning the attribute to the print data within the object area; and
   printer means for printing the input print data on a tape-like printing medium according to the attribute set by the attribute setting means,
   wherein when the position specifying means specifies a position in the print data displayed by the display means to thereby define a first area before the position and a second area after the position, the attribute setting means determines the second area as an object area and changes the size of at least one character contained in the second area.

5. A tape printing apparatus comprising:
   input means for inputting print data representative of at least one character and control data relative to an attribute of the print data;
   display means for displaying the print data input by the input means;
   position specifying means for indicating a position of the print data displayed by the display means and outputting position data representative of the position of the print data;
   attribute setting means, responsive to the control data provided by the input means and the position data provided by the position specifying means, for determining an object area in which an attribute of the print data is to be set in at least a portion of the print data and assigning the attribute to the print data within the object area; and
   printer means for printing the input print data on a tape-like printing medium according to the attribute set by the attribute setting means,
   wherein the print data is representative of a paragraph having a plurality of lines containing a plurality of words, and when the position specifying means specifies a head of the paragraph, the attribute setting means determines the paragraph as an object area and changes the size of the words in a unit of one line.

6. A tape printing apparatus according to claim 5, wherein when the position specifying means specifies a position other than the head of the paragraph, the attribute setting means determines an area in the paragraph after the position as an object area and changes the size of the words in the object area in a unit of one line.

7. A tape printing apparatus comprising:
input means for inputting print data representative of at least one character and control data relative to an attribute of the print data;
display means for displaying the print data input by the input means;
position specifying means for indicating a position of the print data displayed by the display means and outputting position data representative of the position of the print data;
attribute setting means, responsive to the control data provided by the input means and the position data provided by the position specifying means, for determining an object area in which an attribute of the print data is to be set in at least a portion of the print data and assigning the attribute to the print data within the object area; and
printer means for printing the input print data on a tape-like printing medium according to the attribute set by the attribute setting means,
wherein when the position specifying means specifies a position in the print data displayed by the display means to thereby define a first area before the position and a second area after the position, the attribute setting means determines the second area as an object area and changes character ornament of at least one character contained in the second area.

8. A tape printing apparatus comprising:
input means for inputting print data representative of at least one character and control data relative to an attribute of the print data;
display means for displaying the print data input by the input means;
position specifying means for indicating a position of the print data displayed by the display means and outputting position data representative of the position of the print data;
attribute setting means, responsive to the control data provided by the input means and the position data provided by the position specifying means, for determining an object area in which an attribute of the print data is to be set in at least a portion of the print data and assigning the attribute to the print data within the object area; and
printer means for printing the input print data on a tape-like printing medium according to the attribute assigned by the attribute setting means.

9. A tape printing apparatus according to claim 8, wherein the print data is representative of a text, the text including at least one paragraph having a plurality of lines containing a plurality of words, and when the position specifying means specifies a position in the print data displayed by the display means, the attribute setting means selectively determines one of the following areas as the object area:

a) at least one of the words contained in an area after the position;
b) one of the plurality of lines including the position;
c) the at least one paragraph; and
d) the text.

10. A method of setting character attribute of print data in a tape printing apparatus, the method comprising:
indicating a position of the print data displayed by display means; and
in response to the indication of the position, determining an object area in which an attribute of the print data is to be set in at least a portion of the print data, and assigning the attribute to the print data within the object area.

11. A method of printing on a tape-like printing medium, the method comprising the steps of:
inputting print data representative of at least one character and control data relative to an attribute of the print data;
displaying the input print data;
indicating a position of the displayed print data and outputting position data representative of the position of the print data;
responsive to the control data and the position data, determining an object area in which an attribute of the print data is to be set in at least a portion of the print data and assigning the attribute to the print data within the object area; and
printing the input print data on a tape-like printing medium according to the assigned attribute;
wherein when the position data is indicative of a specified position to thereby define a first area before the position and a second area after the position, the second area is determined as an object area; and
changing the size of at least one character contained in the second area.

12. A method of printing on a tape-like printing medium, the method comprising:
inputting print data representative of at least one character and control data relative to an attribute of the print data;
displaying the input print data;
indicating a position of the displayed print data and outputting position data representative of the position of the print data;
responsive to the control data and the position data, determining an object area in which an attribute of the print data is to be set in at least a portion of the print data and assigning the attribute to the print data within the object area; and
printing the input print data on a tape-like printing medium according to the assigned attribute.

13. A method according to claim 12, wherein the print data is representative of a text, the text including at least one paragraph having a plurality of lines containing a plurality of words, and when a position is specified in the displayed print data, one of the following areas is selectively determined as the object area:

a) at least one of the words contained in an area after the position;
b) one of the plurality of lines including the position;
c) the at least one paragraph; and
d) the text.

* * * * *